United States Patent [19]

Huizinga et al.

[11] 4,416,007

[45] Nov. 15, 1983

[54] DIGITAL CONFERENCING METHOD AND ARRANGEMENT

[75] Inventors: Donald D. Huizinga; Paul W. Thompson, both of Indianapolis, Ind.

[73] Assignee: Bell Telephone Laboratories, Incorporated, Murray Hill, N.J.

[21] Appl. No.: 323,416

[22] Filed: Nov. 20, 1981

[51] Int. Cl.³ .............................................. H04M 3/56
[52] U.S. Cl. .................................... 370/62; 179/18 BC
[58] Field of Search .......................... 370/61, 62, 68; 179/1 CN, 18 BC

[56] References Cited

U.S. PATENT DOCUMENTS

| | | |
|---|---|---|
| 4,048,449 | 9/1977 | Natebusch . |
| 4,049,921 | 9/1977 | Zwack . |
| 4,119,807 | 10/1978 | Nahay . |
| 4,230,908 | 10/1980 | Davis et al. ........................ 179/1 CN |
| 4,280,216 | 7/1981 | Zeitrag ............................... 370/62 |
| 4,288,871 | 9/1981 | Baugh ................................. 370/86 |

OTHER PUBLICATIONS

Bell System Technical Journal; vol. 54, No. 5, May, Jun. 1975, "Local Distribution System", by E. C. Bender et al., p. 920.

Primary Examiner—Benedict V. Safourek
Attorney, Agent, or Firm—John A. Caccuro

[57] ABSTRACT

A method and arrangement is disclosed for providing a digital conference capability for subscribers of a time division multiplex (TDM) communication system. Each conferee's pulse code modulation (PCM) signal is assigned one of N conference time slots of the TDM system. The arrangement serially stores in memory the PCM signals of $N-1$ time slots. Circuitry serially generates the sum of the previously stored $N-1$ time slot PCM signals concurrently with the serial writing into memory of the PCM signal of each time slot. During each time slot a composite PCM conference signal is formed by combining the PCM signal of that time slot with the summed PCM signal and distributed to the conferees assigned to that time slot.

20 Claims, 5 Drawing Figures

1

DIGITAL CONFERENCING METHOD AND ARRANGEMENT

FIELD OF THE INVENTION

This invention relates to digital communication systems and more particularly to a digital conferencing method and arrangement for a system where communication between stations is via a continuous loop.

BACKGROUND OF THE INVENTION

In one type of digital communication system, the subscriber stations are connected over a continuous loop facility to minimize the wiring between the subscriber stations and a common controller of the system. In such a digital loop communication system, the controller establishes a time division multiple (TDM) communication format where each signal frame includes multiple communication channels (time slots) as well as framing said control bits. Each subscriber station is synchronized to the TDM signal and appropriately receives and transmits signals in the correct communication channel or time slot of the TDM system. Such a signal is shown in U.S. Pat. No. 4,048,449, issued on Sept. 13, 1977 to Roderick Natebusch, which patent is hereby incorporated by reference herein as if reproduced in full.

The Natebusch patent discloses a conferencing call method for a time division multiplex (TDM) pulse code modulation (PCM) closed loop digital communication system. In that system, each subscriber station is connected to the digital loop by an interface circuit which operates to remove that conferees signal sample from the received loop signal to yield the sum of the signals from the other conferees. The outgoing signal is generated by adding that conferee's new signal sample to the existing sum of the signals from the other conferees. Additionally, that conferee's signal sample is stored by the interface for one frame cycle and subtracted from the received loop signal during the next frame to form that conferee's received signal.

It is also known in the art to connect multiple central office lines to such a digital loop communication system using standard TDM techniques. In such an arrangement, the signals from each central office line is digitally encoded and multiplexed as a separate communication channel or word in the TDM data frame. A conference call between a subscriber on one of these central office lines and subscribers on the digital loop system utilizes the communication channel assigned to the central office line for conversation transmission between the conferees. The voice conversation signals from the subscriber on the central office line are PCM encoded and handled by the digital loop system in the same manner as any loop subscriber signals. Thus, the signals from the central office line are appropriately added to and/or subtracted from the loop signal in the communication channel associated with that central office line.

However, when it is desired to establish a conference call including subscribers of two separate central office (CO) lines and subscribers of the digital loop system a problem arises because subscribers of one CO line communicate over a TDM channel which is different from the TDM channel that subscribers of the second CO line communicate. Thus, to assure that all the conference subscribers (conferees) receive the proper conference signal, the signals of one TDM channel (time slot) must be coupled to the second TDM channel and vice versa.

SUMMARY OF THE INVENTION

The disclosed digital telephone conferencing method and arrangement solves the problem of conferencing subscribers on two or more CO lines one or more subscribers of a time division multiplex (TDM) digital loop communication system.

In the disclosed digital conferencing method and arrangement, the pulse code modulation (PCM) words of each CO line is assigned one of N conference time slots in a TDM data frame. The disclosed arrangement serially stores in a conference memory the PCM words of N-1 CO lines participating in the conference call. The arrangement serially generates the sum of the previously stored N-1 CO line PCM words concurrently with the serial writing (inputting) into memory of the PCM word of the CO line associated with the current time slot. A composite PCM conference signal is formed, during each time slot by combining the PCM word of the current time slot with the summed PCM words of all other time slots, and distributed to the conferees assigned to that time slot.

A telephone call between a first subscriber (conferee) on the digital loop system and a second subscriber on a first CO line takes place over a first time slot allocated to that first CO line. A two CO line conference call is established by adding to the existing call a third subscriber located on a second CO line. Since the third subscriber is communicating over a second time slot, that of the second CO line, circuitry is provided to make the third subscribers signal available to the first and second subscribers communicating over the first time slot. Likewise, the communications in the first time slot are made available to the third subscribers in time slot 2. In general when a conference call involves N CO lines, the circuitry provides subscribers of each CO line with the sum of the signals from subscribers of the N-1 other CO lines as well as the signals from the loop subscribers.

During the above-described two CO line reference call the conference arrangement receives pulse code modulated (PCM) time division multiplexed (TDM) signals (words) from conferees on the first and second CO lines in a respective first and second time slot. The conference arrangement also receives PCM TDM signals from the digital loop conferee in either the first or second time slot. A composite PCM TDM signal is formed during each respective time slot by adding the received loop conferee's PCM TDM signal to the received CO line conferee's signal occurring during the same time slot. The composite PCM TDM signal is written during each respective time slot into a serial register. Concurrently, a previously written composite PCM TDM signal from the other respective time slot is read from the serial register. This composite signal read from the serial register during each time slot is added to the corresponding received CO line conferee signal of that time slot. The result is a composite loop transmit signal for each time slot which is transmitted over the digital loop system. The composite PCM TDM signal from the serial register is also added to the PCM TDM signal received from the digital loop system during each respective time slot. The result is a composite CO transmit signal for each time slot which is transmitted over the CO line associated with that time slot.

BRIEF DESCRIPTION OF THE DRAWINGS

The principles of the invention will be more fully appreciated from the illustrative embodiment in the drawings, in which.

DETAILED DESCRIPTION

General

Figure 1:
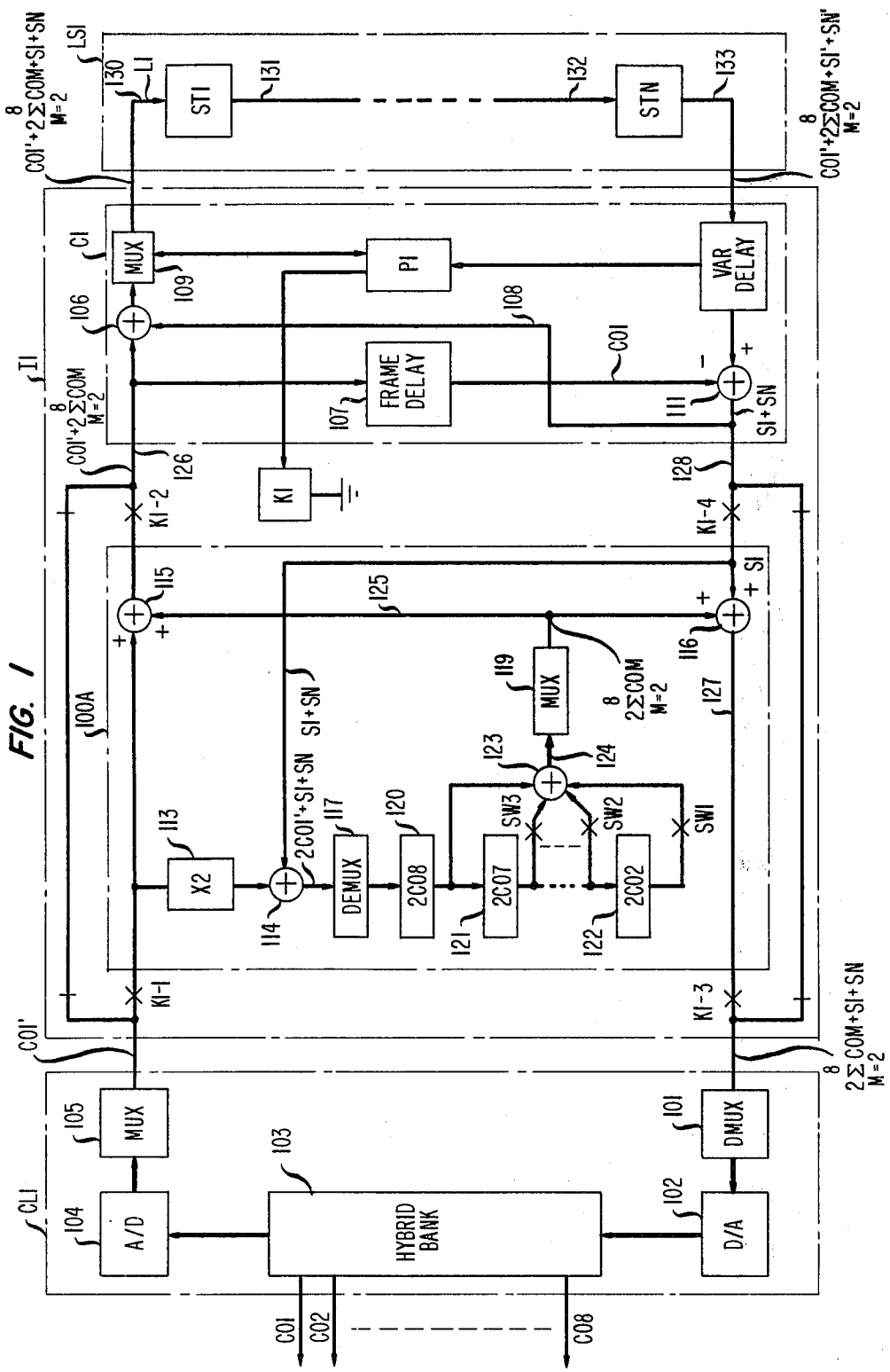
FIG. 1 shows a block diagram of a general embodiment of our conferencing arrangement as utilized with a digital loop system.

Shown in FIG. 1 is a block diagram of a digital communication system consisting of digital loop system LS1, interface I1, and central line interface CL1. The digital loop system includes subscriber or station sets ST1 through STN connected over a digital loop L1 (130–133) to interface I1. Interface I1 connects the digital loop system to multiple central office lines CO1–CO8 via central line interface CL1. The conferencing arrangement 100A is disposed between central line interface CL1 and digital loop coupler C1 of interface I1. Central line interface CL1 includes demultiplexer 101 which receives a TDM signal from interface I1 and demultiplexes each time slot signal to the assigned CO line via one of the eight (one per CO line) digital/analog (D/A) converters of unit 102 and one hybrid of hybrid bank 103. Thus, for example, a signal in time slot one is demultiplexed by demultiplexer 101 and transmitted via a separate D/A converter and a hybrid to CO line 1. Each of the received analog signals from CO lines CO1–CO8 are digitally encoded by an analog/digital (A/D) encoder of unit 104 into a 16 bit linear pulse code modulation (PCM) format and multiplexed by unit 105 into a TDM data signal which is received by interface I1. While the preferred embodiment utilizes a 16 bit PCM format any binary signal format can be utilized by the disclosed arrangement.

Figure 2:
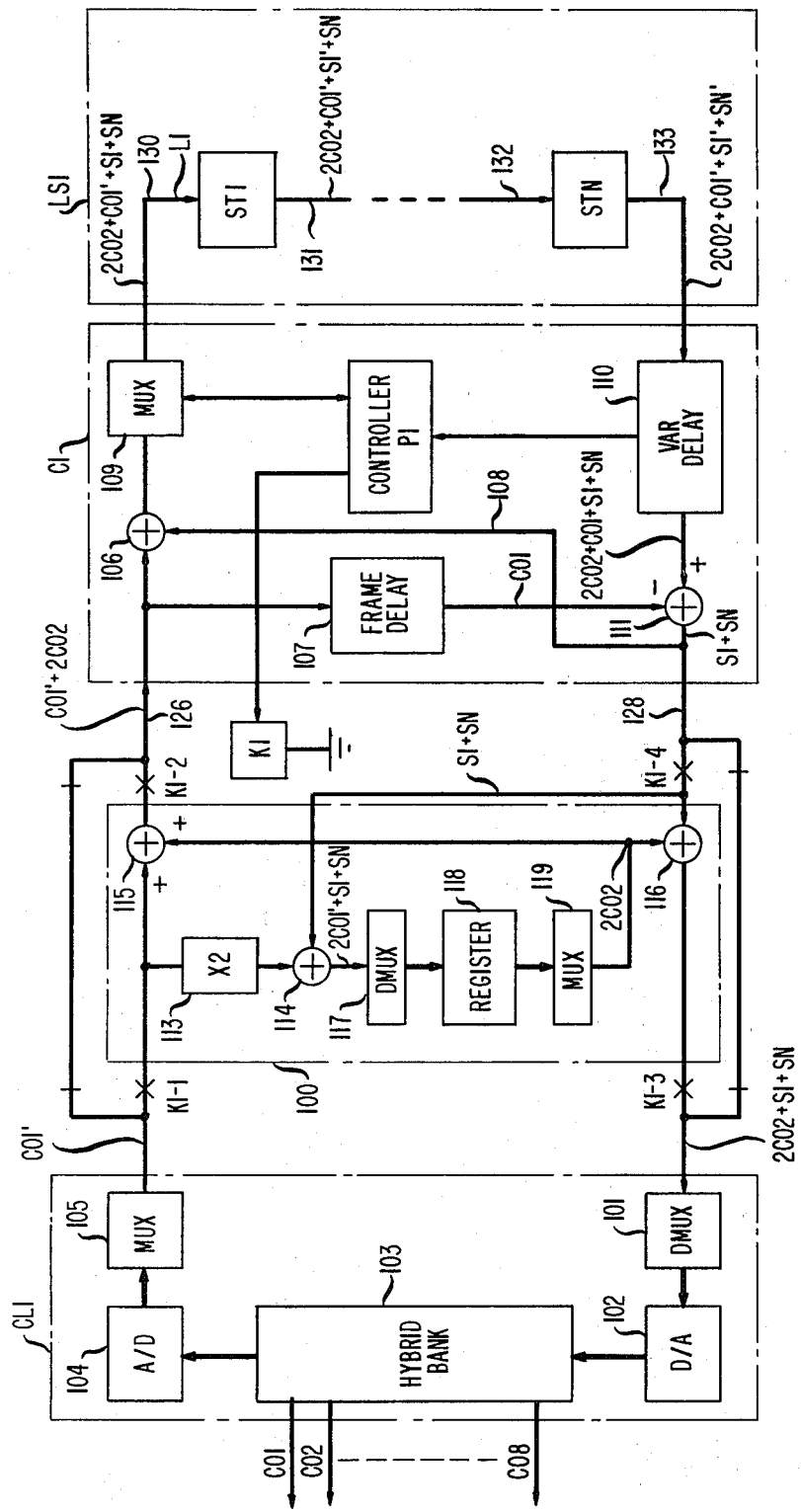
FIG. 2 shows a block diagram of a two CO line conferencing arrangement as utilized with a digital loop system.

As shown in FIG. 1, the disclosed conferencing arrangement 100A is switchably connected between central line interface CL1 and digital loop coupler C1 by transfer contacts K1-1, K1-2, K1-3 and K1-4. Relay K1 is operated only when a conference call involves subscribers on two or more CO lines. Before describing the operation of the disclosed conferencing arrangement 100A, a typical two party call over the digital communication system will be described with reference to FIG. 3. FIG. 2 will be discussed in later paragraphs.

Figure 3:
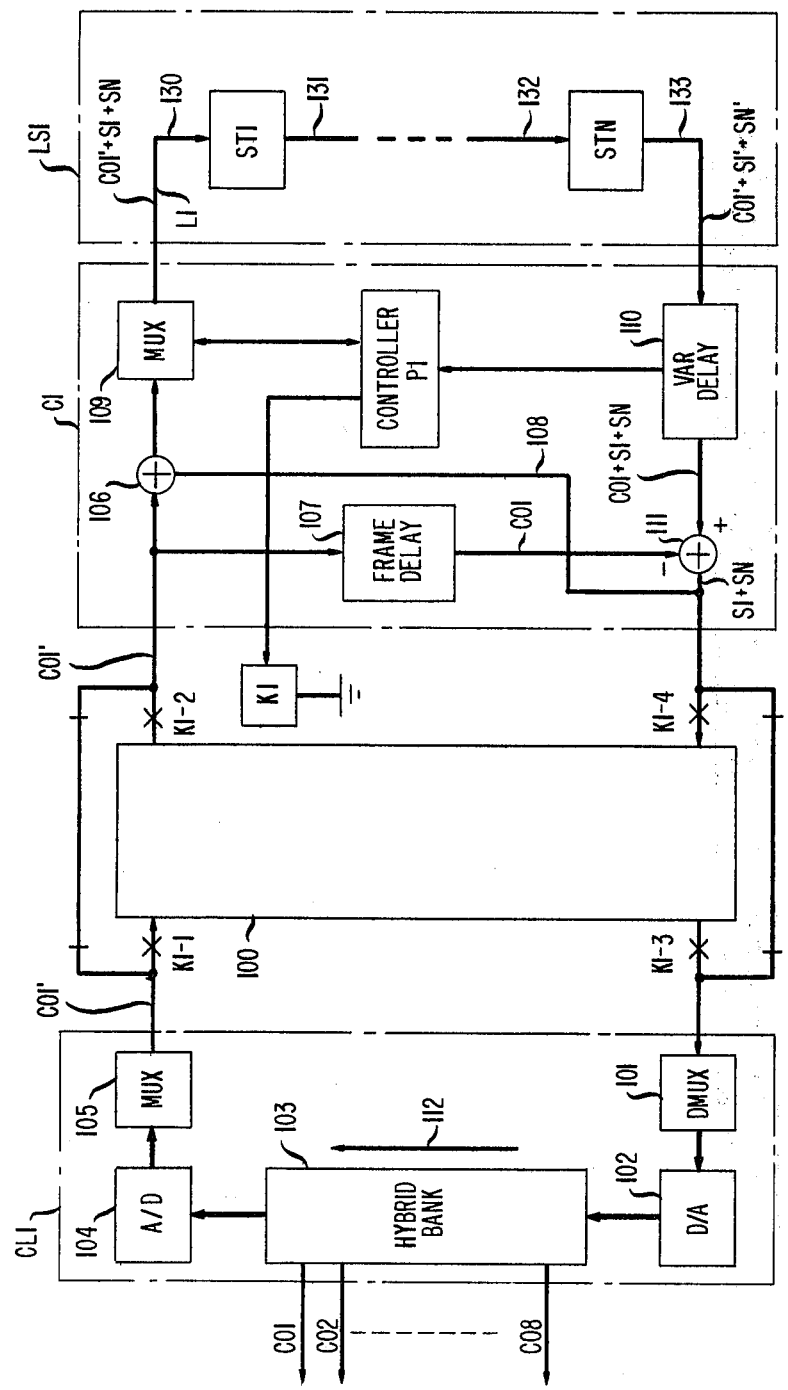
FIG. 3 shows a block diagram of a digital communication system.

Referring to FIG. 3, controller P1 determines from control signals the type of telephone call in progess and whether the disclosed conference arrangement should be connected to the loop system via relay K1. With relay K1 unoperated, conferencing arrangement 100 is disconnected from the system by the make contacts of K1-1, K1-2, K1-3 and K1-4. Station sets ST1 and STN are arranged in series on the two-wire loop L1. (While only two station sets ST1 and STN are shown many more stations are typically connected over loop L1.) Since the station sets ST1 and STN are connected in series a shorting jack is utilized to maintain loop continuity when a station set is removed from loop L1. Loop L1 carries both dc power for the station sets and data over the same two-wire pair. Speech is encoded in a linear PCM code and sent around loop L1 in a TDM format. While a linear PCM code is utilized herein obviously a non-linear code could be utilized with appropriate non-linear to linear conversion circuitry inserted whenever a linear signal is required. Data is transmitted on the loop in the well-known bipolar return-to-zero or alternate mark inversion code. The bipolar return-to-zero data transmission mode is described on page 920 of the article entitled "Local Distribution System", *Bell System Technical Journal*, Vol. 54, No. 5, May–June 1975 by E. C. Bender et al., which description is incorporated by reference herein. Before describing a typical two party call over the digital communication system the format utilized herein for data transmission will be described.

Data Frame Format

Figure 5:
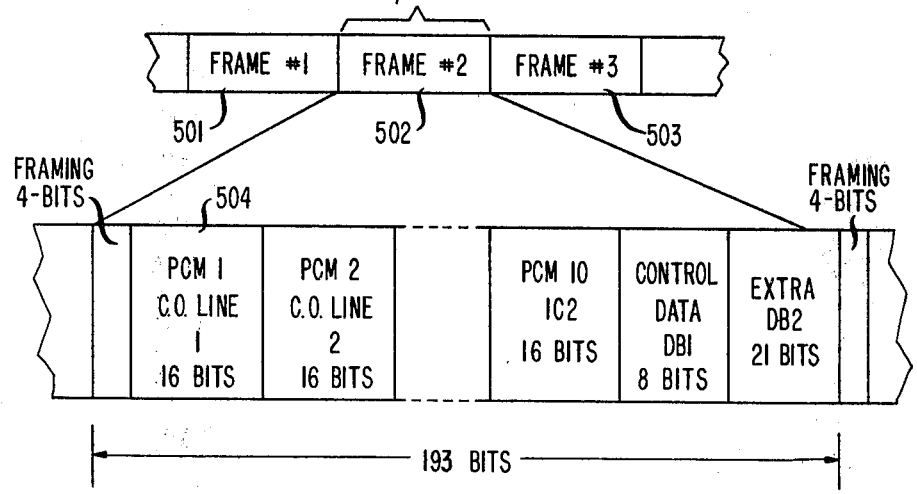
FIG. 5 shows the data frame format of the TDM signal transmitted over the digital loop.

With reference to FIG. 5 the data frame format utilized by the digital loop system is illustrated. To digitize speech it is necessary to sample it at a 8 kHz rate. Thus, the frame rate is 8 kHz and each frame, 501–503, is 125 μsec long. At a T1 data rate of 1.544 megabits per second there are 193 bits in each 125 μsec frame 502. Sixteen bits are used for each linear PCM speech sample. In the disclosed example, frame 502, there are 10 PCM speech sample time slots (PCM1 through PCM10). These time slots can be utilzed for conversations between a loop subscriber and a subscriber on one of the various CO lines (CO line 1 through CO line 8) or for intercom conversations between loop subscribers (IC1 and IC2). As illustrated eight separate CO line conversations and two separate intercom conversations are possible in this particular format.

As shown in FIG. 5, framing is provided by the first four bits of the frame and utilizes the well-known bipolar violation format, described in the above-identified Bender et al article, to distinguish the framing bits from other bits of the frame. The frame include eight bits called control data bits DB1 which are used to control each subscriber (station) set. These control bits enable the subscriber sets to receive various telephone status information from system controller P1 in interface I1 and to signal or request changes in the telephone operating mode to the system controller P1.

The rate at which subscriber status and control data is to be updated determines the number of data blocks DB1 associated with each loop subscriber set. The first data block DB1 includes the subscriber's address while subsequent data blocks DB1 would include subscriber supervision, signaling, ringing, C0 line status, intercom line status, button status, display status, dial status and conferencing status. Some data blocks, DB1, are addressed to all sets with information that is common to them. Other data block DB1 are addressed to individual sets. Each subscriber set receives the data block DB1 addressed to that station, modifies or updates certain data bits and transmits the new data block DB1 back to the system controller. The extra data block DB2 of data frame 502 can be utilized for additional control or as an additional communication channel.

Subscriber Station Operation

Figure 4:
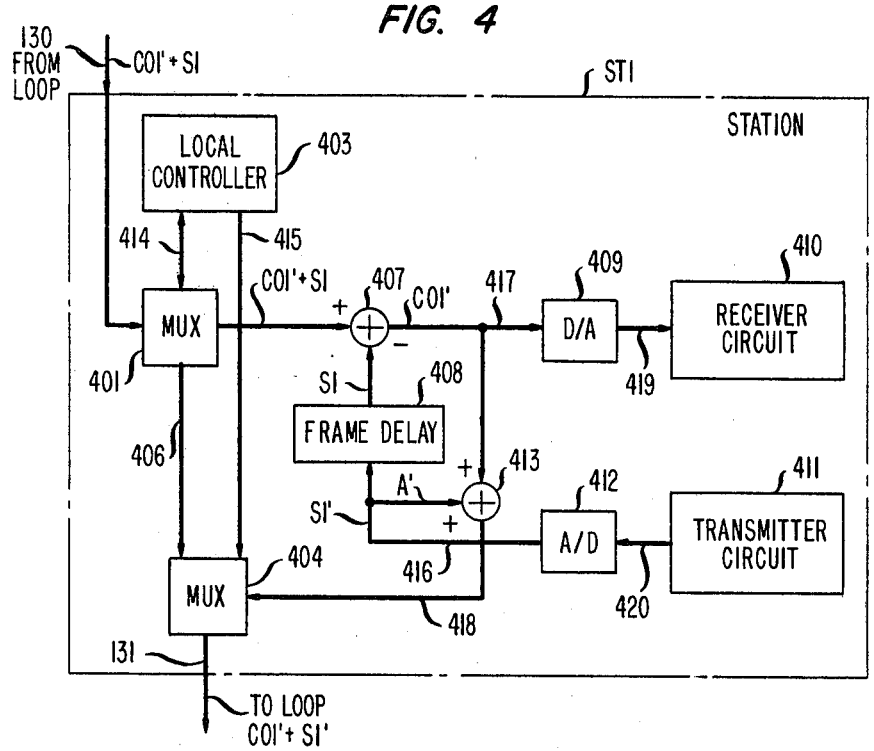
FIG. 4 shows a block diagram of the station units of the digital loop system.

The operation of a subscriber's station set during a typical two party call on the digital loop system is described in the following paragraphs. FIG. 4 illustrates a block diagram of a loop subscriber's station set ST1. Loop station STN is identical to station ST1. The basic operation of the disclosed station sets ST1 and STN are similar to the operation of subscriber stations A, B, C of the previously identified Natebusch patent.

With reference to FIG. 4, assuming that a subscriber at station ST1 is conversing with a subscriber on CO line 1 (of FIG. 1) the following operations result at station ST1. Multiplexer 401 strips off data block DB1 from the data received over section 130 of loop L1. The data block DB1 is received over lead 414 and processed by local controller 403. Local controller 403 decodes the data bits and determines the operating status of station ST1. In our example, local controller 403 determines from data block DB1 that a subscriber at station ST1 is in a conversation with a subscriber CO line 1. Local controller 403 also encodes any changes in the status or control at station ST1 into data block DB1 via lead 415 and multiplexer 404. The binary data in the time slots and utilized by station ST1 are bypassed around station ST1 by lead 406 between multiplexer 401 and multiplexer 404. Multiplexer 404 TDMs the data on leads 406, 418, and 415 into the data frame for transmission over section 131 of loop L1. The switching between the appropriate data paths and decoders is exercised by multiplexers 401 and 404 which are controlled by local controller 403 acting in response to information in data block DB1.

The received TDM loop signal CO1'+S1 is received by station ST1 over station 130 of loop L1. The component CO1' represents the signal originating from a subscriber on CO line 1. The component S1 represents the signal originating from the subscriber at station set ST1. Since the conversation involves a subscriber on CO line 1 the PCM signal (or word) CO1'+S1 is placed, illustratively, in time slot 1 of the data frame. For example, with reference to FIG. 5, such signals would appear in time slot 504 of data frame 502. It is to be noted that a primed signal represents the most recent signal sample. Thus, signal CO1' is the most recent signal sample from the subscriber on CO line 1 and signal CO1 is an one frame old signal. With reference to FIG. 5, signal CO1' exists during time slot 1 (504) while signal CO1 exists during time slot 1 of prior data frame 501.

Returning to FIG. 4, the loop signal CO1'+S1 of time slot 1 is stripped out of the data sequence by multiplexer 401 and coupled to subtractor 407. The signal S1 previously stored in frame delay 408 during time slot 1 of the prior frame is subtracted from CO1'+S1 by subtractor 407. Since signals CO1'+S1 and S1 exist in a serial linear binary form where the least significant bits are outputted first, subtractor 407 can be a well-known relatively simple one bit binary subtractor.

The output signal CO1' of subtractor 407 is reconstructed by digital to analog (D/A) unit 409 into an analog signal for outputting to the subscriber via receiver circuit 410. The voice signals received from transmitter 411 are digitized into a PCM format by analog to digital (A/D) converter 412. The signal S1' out of A/D converter 412 is the most recent PCM encoded voice signal which is stored in frame delay 408 for subtraction from subsequent received loop signals. Thus, in essence any voice signal (S1') that the subscriber adds to the transmitted loop signal is subtracted off the received loop signal during the next frame. The output S1' of A/D converter 412 is also added by adder 413 to the output CO1' of subtractor 407 to form the new composite loop signal CO1'+S1' on lead 418. Multiplexer 404 combines into a new frame of data the signal CO1'+ST1' for time slot 1 on lead 418, the signal on lead 406 representing both framing and the remaining time slot signals, and the data blocks DB1 and DB2 received over lead 415 from local controller 403.

The implementation of subscriber station ST1 involves the use of standard well known digital logic circuitry. For example, subscriber station ST1 can be implemented as described in the previously referenced Natebusch patent which has been incorporated by reference herein.

Single CO Line Conference Call

With reference to FIG. 3, when a conference call involves a subscriber on CO line 1 and stations ST1 and STN on the digital loop system the following signals exist on loop L1. The loop signal on section 130 of loop L1 is CO1'+S1+SN. Since the conference call involves only one CO line, CO line 1, this conference signal is contained in time slot 1 of the TDM data frame (loop signal). As noted in the above paragraph, when the loop signal CO1'+S1+SN passes through station ST1 the current PCM voice signal sample S1' replaces signal S1 and the loop signal CO1'+S1'+SN results on section 131 of loop L1. Since none of the stations between ST1 and STN are part of this conference call the loop signal CO1'+S1'+SN exists on section 132 of loop L1. In a similar manner, loop signal CO1'+S1'+SN is modified after passing through station STN and becomes loop signal CO1'+S1'+SN' on section 133 of loop L1.

Since the conference call involves only one CO line, controller P1 does not operate relay K1. Hence, the make contacts of K1-1, K1-2, K1-3 and K1-4 keep the disclosed conferencing arrangement 100 out of a circuit connection between the central line interface CL1 and digital loop coupler C1 of interface I1. Note, relay K1 and its contacts are merely illustrative, well known semiconductor gates or multiplexers can be used as the enabling and disabling apparatus for conferencing arrangement 100.

Analog signals on CO line 1 are connected through a hybrid of hybrid bank 103 and converted by a well known A/D converter 104. A standard multiplexer 105 TDMs the resulting PCM signal CO1' of CO line 1 into time slot 1 of the data frame. The resulting signal CO1' is conducted through the break contacts of K1-1 and K1-2 to digital loop coupler C1. It is to be noted that digital loop coupler C1 operates similar to the previously described station ST1. Signal CO1' into digital loop coupler C1 connects to adder 106 and frame delay 107. Frame delay 107 stores signal CO1' for a 125 $\mu$sec, the time length of one frame of data. Frame delay 107 is similar to buffer storage S of the Natebusch patent.

Adder 106 serially combines or adds signal CO1' with the signal S1+SN on lead 108. The output signal of adder 106 is CO1'+S1+SN. The output of adder 106 connects to multiplexer 109 which strips off and inserts data block DB1 of the data frame. Controller P1 connects to multiplexer 109 and decodes control bits DB1 into changes of control or status from the loop station sets ST1 through STN.

Controller P1 in the interface unit controls the line circuits, hybrids, codecs, filters etc. required to perform the various telephone system features and functions. Controller P1 also generates and processes (1) the digital PCM signals which are time division multiplexed from the various CO line time slot signals, (2) the frame synchronization signals and (3) the system control signals DB1 and/or DB2. Controller P1 determines from the system control signals the type of telephone call in progress and whether the disclosed conferencing arrangement should be connected to the loop system. Controller P1 can be implemented utilizing a well known microprocessor, such as an Intel 8085A with associated ROM and RAM memories and interface circuitry. As previously noted only the features, functions or signaling required to understand the disclosed invention are described herein. The operation of the standard digital telephone operations are well known and are not described herein.

As noted previously the signal on section 133 of loop L1, CO1'+S1'+SN', enters variable delay buffer 110 of digital loop interface C1. Variable delay buffer 110 is, illustratively, similar to central timing station Z of the Natebusch patent. Variable delay buffer 110 holds the signal until the start of the next frame and makes the delay exactly 125 $\mu$sec. Thus, the total time delay which results when the signals are transmitted over loop L1 combined with the processing delays of stations ST1 through STN are quantized in variable delay buffer 110 into a one frame delay. The signal exiting variable delay buffer 110 is the signal from the prior frame or CO1+S1+SN. The output of frame delay 107 is CO line 1 signal, CO1, which is one frame old. Subtractor 111 is a standard well known circuit which subtracts the signal out of frame delay 107 from the signal out of variable delay buffer 110 forming the signal S1+SN. Signal S1+SN appears on lead 108. As previously noted the signal on lead 108 is summed together with signal CO1 in adder 106. In a manner similar to that described for station ST1 a fractional multiplier in the feedback lead 108 can be used to eliminate any unwanted noise build up in the system.

The output of subtractor 111 also connects through the break contacts of K1-4 and K1-3 to demultiplexer 101 of central line interface CL1. Demultiplexer 101 is a standard well known 1 to 8 selector for selecting the D/A converter associated with CO line 1. This D/A converter is a standard well known circuit which produces an analog signal output from the PCM digital signal inputted. The analog output from this D/A converter is connected to the transmit port of a hybrid of hybrid bank 103 associated with CO line 1. The output of this hybrid couples the signal to CO line 1.

Returning to FIG. 4, the previous description of the operation of station ST1 did not include the provision of a sidetone signal. Typically sidetone is provided at each subscriber's station set by coupling a fraction of the signal from the transmitter back to the receiver. Such sidetone can be provided as an analog voltage by a suitable feedback path (not shown) between leads 420 and 419. Sidetone can also be provided in a digital form by a suitable feedback between leads 416 and 417 (not shown). Alternatively, sidetone can be provided on a centralized basis at interface I1. Referring to FIG. 3 again, such a sidetone signal can be provided on a centralized basis as a fractional transhybrid signal 112 across each hybrid of hybrid bank 103. To simplify the following conference call discussions it is ssumed that signal 112 is zero. If a fractional transhybrid signal 112 exists it represents an additional signal out of multiplexer 105 during each time slot.

A Two CO Line Conference Call

FIG. 2 illustrates the connection of the disclosed conferencing arrangement 100 to central line interface CL1 and digital loop coupler C1. Control bits DB1 of the data frame indicate when a loop subscriber is requesting the establishment of a conference call involving at least two other subscribers each on a different CO line. Control bits DB1 are decoded by controller P1 which activates relay K1. Relay contacts K1-1, K1-2, K1-3 and K1-4 connect conferencing arrangement 100 between central line interface CL1 and digital loop coupler C1. Conferencing arrangement 100 enables conversation on any two CO lines to be conferenced together. Conferencing arrangement 100 includes digital multiplier circuit 113, adders 114, 115 and 116, demultiplexer 117, shift register or slot delay 118 and multiplexer 119. The disclosed centralized conferencing arrangement eliminates the need of additional circuitry at loop subscriber's station set to provide a multiple CO line conference capability.

The following description assumes that a subscriber on a second CO line has been added to the previously described (in FIG. 3) single CO line conference call. As previously described, the signals S1 and SN are the PCM signals from subscribers on the digital loop while CO1 is the PCM signal from the subscriber on CO line 1. These signals are added together in time slot 1, the time slot associated with CO line 1.

The addition of a subscriber on a second CO line 2 to the existing call on CO line 1 requires that the subscribers on CO line 1 hear the conversation of subscribers on CO line 2 and vice versa. As previously described each subscriber's station set participating in the CO line 1 call picks off the loop signal in time slot 1. The subscriber's PCM voice signal of the previous frame is subtracted from the loop signal and the subscriber's latest PCM voice signal is added to the loop signal. When a subscriber on a second CO line, CO line 2, is added to form a conference call or to extend a conference call the voice signal of that subscriber exists in the time slot, time slot 2, associated with CO line 2. The disclosed conferencing arrangement 100 adds the PCM voice signals of time slot 2 into time slot 1 and adds the PCM voice signals of time slot 1 into time slot 2. Consequently, each loop subscriber's station set need only monitor his own assigned time slot to obtain the total conference signal. This centralized conferencing arrangement 100 reduces the required complexity of the station sets for loop L1 subscribers.

Referring to FIG. 2, during time slot 1 the PCM voice signal CO1' received from subscribers on CO line 1 is multiplied by a factor 2 by multiplier 113. Adder 114 combines the output signal 2CO1' from multiplier 113 with the sum of the signals S1+SN from the loop subscribers connected to CO line 1. The resulting signal 2CO1'+S1+SN is gated by demultiplexer 117 into serial memory or shift register 118. Since up to eight CO lines are shown interfaced to the digital loop system, four registers (only one 118 shown in FIG. 2) are required to handle a potential of four conference calls involving two CO lines each. Demultiplexer 117 and multiplexer 119 operate under control of controller P1 to connect the signals of the CO lines which are conferenced together to the same register 118. In the preferred embodiment register 118 is a 16 bit serial shift register which saves signals from one time slot to be inserted into another time slot of the conference call. Register 118 is arranged such that when the PCM signal is shifted in the PCM signal from the other CO line in the conference call is shifted out.

Demultiplexer 117 and multiplexer 119 operate under control of controller P1 to connect both CO line 1 and CO line 2 to register 118 during their respective time slots. Thus, PCM signals from CO line 1 time slot 1 are inputted or serially shifted bit by bit into register 118 while concurrently the signals from the previous frame for CO line 2 time slot 2 are serially shifted out in a bit by bit manner. It is to be noted that the word "concurrently" as used herein means during or in correspondence with the bit by bit serial inputting of signals. In our example 2CO1'+S1'+SN' is shifted into register 118 during time slot 1 while 2CO2 is shifted out. As noted previously, the unprimed signals represent signals which existed in a frame prior to the frame where the primed signals currently exist. The CO line 2 time slot 2 signal 2CO2 outputted during time slot 1 from register 118 is gated through multiplexer 119 and into serial adders 115 and 116. Adder 115 combines signals CO1' and 2CO2. The output of adder 115, CO1'+2CO2, is inputted into frame delay 107. The signal output of adder 115, CO1'+2CO2, is also combined with signal S1+SN in adder 106 to form the new composite loop transmit (loop conference) signal CO1'+2CO2+S1+SN which is transmitted over loop L1.

The operations performed by station sets ST1 and STN on the composite loop signal are the same as those operations previously described in FIG. 4.

Adder 116 combines the signal 2CO2 out of multiplexer 119 with the signal S1+SN out of adder 111. The composite CO transmit (CO line conference) signal out of adder 116, 2CO2+S1+SN, is transmitted via demultiplexer 101, a D/A converter of 102 and a hybrid of hybrid bank 103 to subscribers on CO line 1.

Note that subscribers on CO line 1 receive the composite CO transmit signal (CO line conference signal) 2CO2+S1+SN which represents a signal 2CO2 from subscribers of CO line 2 and signals S1+SN from subscribers of the loop system LS1. Note signal 2CO2 from CO line 2 is at a 6 dB higher level (i.e., CO2 is multiplied by 2) than the signal from the loop conferee subscribers (S1+SN). The reason for this is to partially make up for the inherent approximate 12 dB loss when the signal is transmitted between subscribers on two different CO lines. The result is that loop subscribers of CO line 1 will receive a 6 dB higher signal from subscribers on CO line 2.

Correspondingly, during time slot 2 (not shown on FIG. 2), the signal out of multiplexer 105 is CO2'. Since we have assumed no loop subscriber is utilizing time slot 2 of CO line 2 there is no loop subscriber signal out of adder 111, line 108, during time slot 2. The signal out of adder 114 is 2CO2', which is gated by demultiplexer 117 into register 118. Since CO line 1 and CO line 2 share the same conference call they share the same register 118. Thus, as signal 2CO2' is shifted into register 118 the signal 2CO1'+S1+SN previously loaded into register 118 during time slot 1 is concurrently shifted out of register 118. This signal is gated by multiplexer 119 into adders 115 and 116. The resulting composite output signal of adder 115 is CO2'+2CO1'+S1+SN. This signal is added in adder 106 to the signal on lead 108. Since there is no signal on lead 108 signal CO2'+2CO1'+S1+SN is transmitted over loop L1 during time slot 2. The output of adder 116, 2CO1'+S1+SN, is transmitted via multiplexer 101, D/A converter 102 and hybrid bank 103 to subscribers on CO line 2.

Note that subscribers on CO line 2 receive the conference signal 2CO1'+S1+SN from CO line 1 at a 6 dB higher lever (i.e., CO1' is multiplied by 2) than the signal from the loop subscribers (S1+SN). Again, as noted previously, the reason is to partially make up for the approximate 12 dB loss when the signal is transmitted between subscribers on two different CO lines. The result is that loop subscribers communicating over time slot 2 of CO line 2 (none in our example) also receive a 6 dB higher signal from subscribers on CO line 1.

Thus, in summary during time slot 1 the loop subscribers receive the loop conference signal 2CO2+CO1'+S1+SN from subscribers of CO line 1, CO line 2 and loop L1. Subscribers on CO line 1 receive, during time slot 1, the CO line conference signal 2CO2+S1+SN from subscribers on CO line 2 and subscribers on loop system L1. During time slot 2 the loop subscribers receive the loop conference signal CO2'+2CO1'+S1+SN from subscribers of CO line 1, CO line 2, and loop L1. Finally, during time slot 2 subscribers on CO line 2 receive the CO line conference signal 2CO1'+S1+SN from subscribers on CO line 1 and subscribers on loop system L1.

It is to be noted that the disclosed arrangement can be utilized to conference separate loop intercom conversations, each having a separate communication time slot (as shown by time slot IC2 of FIG. 5), in a manner similar to that described above.

A Multiple CO Line Conference Call

FIG. 1 illustrates the connvection of multiple CO line conferencing arrangement embodiment 100A to central line interface CL1 and digital loop coupler C1. The operation of multiple CO line conferencing arrangement 100A is basically the same as the operation of conferencing arrangement 100 previously described with reference to FIG. 2. Control bits DB1 of the data frame indicate when a loop subscriber is requesting the establishment of a conference call involving two or more different CO line subscribers. Controller P1 activates relay K connecting conferencing arrangement 100A during such a conference call request.

Conferencing arrangement 100A enables conversations on two or more CO lines to be conferenced together. Conferencing arrangement 100A is basically the same as conferencing arrangement 100 of FIG. 2 except that 16 bit serial shift register 118 is replaced by multiple 16 bit serial shift registers 120, 121, . . . , 122 and multiple input adder 123. Since 8 CO lines are shown four groups of shift registers 120, 121, . . . , 122 and adder 123 (only one group is shown in FIG. 1) are required to handle a potential of four simultaneous conference cells involving two or more CO lines each. In such an arrangement, demultiplexer 117 distributes the binary signal to the proper group of shift registers while multiplexer 119 concurrently selects the binary sum signal associated with that group of shift registers. It is obvious that with the proper type of switching a common pool of shift registers can be appropriately switched to provide for multiple conference calls. Additionally, adder 123 can access in a time shared manner the four groups of shift registers (not shown in FIG. 1) since the conference arrangement processes the time slots one slot at a time in a sequential manner.

Depending on the control bits DB1 controller P1 determines the number N of CO lines in a conference call and enables (via control circuits not shown on FIG. 1) switches SW1, SW2, . . . , SW3 to connect the proper number of shift registers (120, 121, . . . , 122) to adder 123.

If a conference call involves N CO lines then N−1 shift registers are connected into the conference arrangement. For example, if N=8 and 8 CO line conference call would require 7 shift registers to be connected to adder 123. The output of demultiplexer 117 serially inputs signals to the first register 120 which serially connects to the second register 121 etc. until the seventh register 122 is connected. Assuming an 8 CO line conference call, the outputs of the first register 120, second register 121 etc. down to the seventh register 122 are connected via switches SW1, SW2, . . . , SW3 to adder 123. Obviously, the shift registers 120, 121, . . . , 122 can be implemented as one shift register having a (N−1)×16 bit capacity and having the appropriate outputs to feed adder 123. Additionally, adder 123, which generates the sum of signal from the shift registers, can be implemented from well known two input binary adders.

The signals shown in FIG. 1 assumes that loop subscribers' voice conversation signals are communicated over time slot 1 of CO line 1. To simplify the following discussion it is assumed that each time slot associated with the remaining CO lines contain only voice communication from the CO line subscribers. That is, no loop subscriber is communicating over time slots 2 through 8. Thus, the signals contained in time slots 2 through 8 sent over loop L1 contain only the signals of the subscribers of the associated CO lines 2 through 8. While not illustrated by the described example, loop subscribers' voice conversation signal can be communicated over any of the time slots of the CO lines involved in the conference call. Thus, a loop subscriber conversing with a subscriber on a CO line would remain associated with that CO line time slot when that conversation is conferenced with other CO line calls.

FIG. 1 shows the signals which appear at various circuit locations during time slot 1 of an 8 CO line conference call. During time slot 1 the subscriber signal CO1′ from CO line 1 is multiplied by multiplier 113 and added to the loop subscriber's signal S1+SN in adder 114. The combined signal, 2CO1′+S1+SN, is serially gated by demultiplexer 117 into register 120 while signal 2CO8 currently located in register 120 is serially shifted out into register 121. Note signal 2CO8 is the CO line 8 subscriber signal from the prior data frame. The output of register 120 is signal 2CO8 which is serially shifted into both register 121 and transmitted to adder 123. Concurrently therewith, signal 2CO7 is serially shifted out of register 121 to both the next register (not shown) and via switch SW3 to adder 123. Similarly, information is both serially shifted through the other registers (not shown) and transmitted via the appropriate switches to adder 123. Finally, in the last register 122 signal 2CO2 is shifted out to adder 123 via switch SW1. The output of adder 123, line 124, is the sum of the voice signals of time slots 2 through 8 which represents the sum of conference signals 2CO2 through 2CO8 from CO lines 2 through 8. This 16 bit summed output is serially generated by adder 123 on a bit by bit basis while signal 2CO1′+S1+SN is concurrently being serially shifted into register 120 bit by bit. At the end of time slot 1 signal 2CO1′+S1+SN is located in register 120, signal 2CO8 in register 121 etc. and finally signal 2CO3 in register 122.

Similarly, during the next time slot 2 the output of adder 123, line 124, will be the sum of the signal 2CO3 (CO line 3) through 2CO8 (CO line 8) plus 2CO1′+S1+SN.

In a manner similar to that previously described in FIG. 2 the signal out of adder 123 is gated by multiplexer 119 via line 125 into both adder 115 and 116. The output of adder 115 is the serial combination or addition of the output from adder 123 plus signal CO1′. The output of adder 115 line 126, is serially combined with (added to) S1+SN by adder 106 thus forming the composite loop transmit signal (loop conference signal) CO1′+2(CO2+ . . . +CO8)+S1+SN which is transmitted over section 130 of loop L1. During time slot 1 the loop station conferees receive the conference signal and subtract out their prior voice sample and add in their present voice samples. The output of adder 116, line 127, is the composite CO line transmit signal (CO line conference signal) which is gated via interface CL1 to the conferee subscribers on CO line 1. This signal is formed from the output of adder 123 plus signal S1+SN.

During time slot 2 the signal out of adder 115 is CO2′+2CO3+ . . . +2CO7+2CO8+2CO1′+S1+SN. This composite loop transmit signal (loop conference signal) is transmitted to loop L1 during time slot 2. Since no loop subscriber's are conversing during time slot 2 no loop station sets will be utilizing the composite loop signal during time slot 2. Since we have assumed that no loop subscribers are communicating over other than time slot 1, the output of adder 111, line 128, is 0 and the composite loop transmit signal out of adder 106 is the same as the signal out of adder 115. Likewise, the composite CO line transmit signal, line 127, out of adder 116 is the output of adder 123 on line 125 since there is no output from adder 111 on line 128.

In a similar manner the composite loop subscriber signals and composite CO line signals are generated and distributed for time slots 3 through 8. Thus, the arrangement of shift registers 120, 121, . . . , 122 and adder 123 provide a means for serially generating during each time slot a binary sum signal of the previously stored signals concurrently with the serial inputting of signals into the shift registers.

Implementation of multiplier 113, adders 114, 115, 116, 106 and 111, demultiplexers 101 and 107, registers 120, 121, . . . , 122 and 118, multiplexers 105 and 119 can be implemented using any of a variety of standard well known integrated logic circuits. Implementation of frame delay 107 and variable delay 110 can, illustratively, be implemented as described in the previously referenced Natebusch patent. The A/D and D/A of units 104 and 102 can be any of the well known standard devices which can generate a 16 bit linear PCM signal from an analog input and vice versa.

What has been described is merely illustrative of our invention. While the description was directed to a digital telephone communication system the invention can be utilized in any digital communication system. Those skilled in the art may advantageously utilize the concepts taught herein to implement other digital embodiments providing similar functions without deviating from the scope or spirit of the disclosed invention.

What is claimed is:

1. In a time division multiplex (TDM) communication system having at least N binary signal communication time slots, a digital arrangement for providing during each time slot of a preselected group of N time slots a sum of the binary signals of the N−1 remaining time slots of said preselected group
characterized in that
said arrangement includes
means for serially storing N−1 binary signals;
means for serially inputting each binary signal into said storing means during each time slot of said preselected group; and
means for serially generating, during each time slot of said preselected group, a sum of the previously stored N−1 binary signals during the serial inputting of a binary signal into said storing means.

2. In a time division multiplex (TDM) communication system having at least N binary signal communication time slots, a digital arrangement for forming a loop conference signal from N binary signals each associated with a different time slot of said system
characterized in that
said arrangement includes
means for serially storing N−1 binary signals,
means for serially inputting each binary signal into said storing means during each time slot,
means for serially generating during each time slot a binary sum signal from the N−1 previously stored binary signals during the serial inputting of each binary signal into said storing means, and p1 means for serially combining during each time slot each binary signal from said inputting means with said binary sum signal from said generating means to form a loop conference signal for each time slot.

3. The invention of claim 1 or 2 wherein said binary signal is a pulse code modulation (PCM) signal.

4. The invention of claim 1 or 2 wherein said storing means includes N−1 serially connected shift registers and said generating means includes a multiple input adder for serially summing the output from said N−1 shift registers.

5. The invention of claim 1 or 2 wherein said inputting means includes
demultiplexer means for selecting the binary signals to be inputted to said storing means during each time slot.

6. The invention of claim 1 or 2 wherein said arrangement further includes
a second serial storing means for storing one or more binary signals and
a second generating means for serially generating during each time slot a sum of the previously stored binary signals in said second storing means during the serial inputting of each binary signal into said second storing means;
said inputting means includes
means for distributing a binary signal to either said storing means or said second storing means; and
means for selecting either a binary sum signal from said generating means when said storing means is distributed a binary signal from said distributing means or a binary sum signal from said second generating means when said second storing means is distributed a binary signal from said distributing means.

7. The invention of claim 1 or 2 wherein said arrangement further includes
a second serial storing means for storing one or more binary signals and
said inputting means includes means for distributing a binary signal to either said storing means or said second storing means and
said generating means includes
means for accessing either said storing means or said second storing means to form a binary sum signal from the previously stored binary signals concurrently with the serial inputting of each binary signal into, respectively, said storing means or said second storing means.

8. The invention of claim 2 wherein said communication system further includes subscriber stations connected over a central office (CO) line and said arrangement further includes
means (116) for serially combining during each time slot a received communication signal from the loop subscriber stations with said binary sum signal from said generating means to form a CO line conference signal for each time slot.

9. In a time division multiplex (TDM) communication system having at least N binary signal communication time slots, a method of forming a signal during each time slot of a preselected group of N time slots representing the sum of the binary signals of the N−1 remaining time slots of said preselected group of said method characterized by the steps of
serially inputting a binary signal into a N−1 binary signal storing means during each time slot of said preselected group and
serially generating during each time slot of said preselected group a sum of the N−1 previously stored binary signals during the serial inputting of a binary signal into said N−1 binary signal storing means.

10. A method of forming a conference signal from N binary signals of a time division multiplex (TDM) communication system, each binary signal associated with a unique time slot of said system, said method characterized by the steps of
a. serially inputting during each time slot the associated binary signal into an N-1 binary signal memory,
b. serially generating the sum of the previously stored binary signals of the other N-1 time slots for each time slot during said inputting step and
c. combining the signals of step a and b into a conference signal for said system.

11. A time division multiplex (TDM) communication system including subscriber stations connected over a loop facility and including connections to N central office lines, said system further including a conference arrangement for connecting a conference call between subscribers on said loop and subscribers on said N central office (CO) lines
characterized in that
said conference arrangement includes
means for receiving a TDM signal from the subscribers of each CO line in a separate CO time slot;
means for receiving a TDM signal from the loop subscribers in a CO time slot;
means for adding during each respective CO time slot the received loop subscriber TDM signal to the received CO line TDM signal to form a composite TDM signal for each CO time slot;
means for serially storing N−1 composite TDM signals;
means for inputting during each CO time slot the composite TDM signal into said serially storing means;

means for generating in bit synchronism with said inputting means a sum of the N−1 composite TDM signals previously written into said serially storing means;

means for summing during each CO time slot the received CO line subscribers TDM signal, the received loop subscribers TDM signal and the sum of the N−1 composite TDM signal to form a loop transmit TDM signal for each CO time slot;

means for transmitting the loop transmit TDM signal to said loop subscribers during each CO time slot;

means for adding during each CO time slot the received loop subscribers TDM signal to the sum of the composite TDM signal to form a CO transmit TDM signal for each CO time slot and means for transmitting the CO transmit TDM signal to the CO line assigned to each CO time slot.

12. A conference arrangement for use in a time division multiplex (TDM) communication system including subscriber stations connected over a loop facility and including connections to N central office lines, said conference arrangement enabling a conference call between a subscriber on said loop and subscribers on said N central office (CO) lines said conference arrangement characterized in that means for receiving a TDM signal from the subscribers of each CO line in a separate CO time slot, means for receiving a TDM signal from the loop subscribers in a CO time slot, means for adding during each respective CO time slot the received loop subscriber TDM signal to the received CO line TDM signal to form a composite TDM signal for each CO time slot, means for serially storing N−1 composite TDM signals means for inputting during each CO time slot the composite TDM signal into said serially storing means, means for generating in bit synchronism with said inputting means a sum of the N−1 composite TDM signals previously written into said serially storing means, means for summing during each CO time slot the received CO line subscribers TDM signal, the received loop subscribers TDM signal and the sum of the N−1 composite TDM signal to form a loop transmit TDM signal for each CO time slot, means for transmitting the loop transmit TDM signal to said loop subscribers during each CO time slot, means for adding during each CO time slot the received loop subscribers TDM to the sum of the composite TDM signal to form a CO transmit TDM signal for each CO time slot and means for transmitting the CO transmit TDM signal to the CO line assigned to each CO time slot.

13. The invention of claim 11 or 12 wherein said CO line subscribers TDM signal receiving means includes means for multiplying a received CO line subscribers signal by a predetermined constant.

14. The invention of claim 11 or 12 wherein said binary signal is a pulse code modulation (PCM) signal.

15. The invention of claim 11 or 12 wherein said serially storing means includes N−1 serially connected shift registers and said generating means includes multiple adders for serially summing the outputs from said N−1 shift registers.

16. The invention of claim 11 or 12 wherein said inputting means includes demultiplexer means for selecting the binary signals to be inputted to said storing means during time slots of said preselected group.

17. The invention of claim 11 or 12 wherein said arrangement further includes a second storing means for serially storing one or more binary signals and a second generating means for serially generating during each time slot a sum of the previously stored binary signals in said second storing means concurrently with the serial inputting of each binary signal into said second storing means;

said inputting means includes means for distributing a binary signal to either said storing means or said second storing means; and said combining means includes means for selecting either a binary sum signal from said generating means when said storing means is distributed a binary signal from said distributing means or a binary sum signal from said second generating means when said second storing means is distributed a binary signal from said distributing means.

18. The invention of claim 11 or 12 wherein said arrangement further includes a second serial storing means for storing one or more binary signals and said inputting means includes means for distributing a binary signal to either said storing means or said second storing means and said generating means includes means for accessing either said storing means for said second storing means to form a binary sum signal from the previously stored binary signals concurrently with the serial inputting of each binary signal into, respectively, either said storing means or said second storing means.

19. In a pulse code modulation (PCM), time division multiplex (TDM) communication system having subscriber stations connected over a loop facility and having connections to at least two central office lines, a method of connecting a conference call between a subscriber on said loop facility and subscribers on two or more central office (CO) lines, said method characterized by the steps of:

a. receiving a TDM signal from the subscribers of each CO line in an associated CO time slot;

b. receiving a TDM signal from the loop subscribers in a CO time slot;

c. adding during each respective CO time slot the received loop subscriber TDM signal of step (b) to the received CO line TDM signal of step (a) to form a composite TDM signal for each CO time slot;

d. writing during each CO time slot the composite TDM signal of step (c) into a register and concurrently generating therefrom the sum of composite TDM signals previously written into said register;

e. adding during each CO time slot the received CO line TDM signal of step (a), the received TDM loop signal of step (b) and the composite TDM signal of step (d) to form a loop tansmit TDM signal for each CO time slot;

f. transmitting the corresponding loop transmit TDM signal of step (e) to said loop subscribers during each CO time slot;

g. adding during each CO time slot the received TDM loop signal of step (b) to the composite TDM signal of step (d) read from said register to form a CO transmit TDM signal for each CO time slot and h. transmitting the CO transmit TDM signal of step (g) to the CO line assigned to each CO time slot.

20. The method of claim 19 wherein said step (a) includes the step of multiplying each received CO line subscriber TDM signal by a predetermined constant.

* * * * *